United States Patent
Mitake et al.

(10) Patent No.: US 7,986,125 B2
(45) Date of Patent: Jul. 26, 2011

(54) FEEDER-LINELESS TRAFFIC SYSTEM AND CHARGING METHOD THEREFOR

(75) Inventors: Masaya Mitake, Hiroshima (JP);
Katsuaki Morita, Hiroshima (JP);
Masahiro Yamaguchi, Hiroshima (JP);
Hiroshi Yamashita, Hiroshima (JP);
Masaomi Yamada, Mihara (JP);
Kousuke Katahira, Mihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 48 days.

(21) Appl. No.: 12/225,883

(22) PCT Filed: Feb. 20, 2008

(86) PCT No.: PCT/JP2008/053342
§ 371 (c)(1),
(2), (4) Date: Oct. 1, 2008

(87) PCT Pub. No.: WO2008/105434
PCT Pub. Date: Sep. 4, 2008

(65) Prior Publication Data
US 2009/0121678 A1 May 14, 2009

(30) Foreign Application Priority Data
Feb. 27, 2007 (JP) .................. 2007-048148

(51) Int. Cl.
*H02J 7/00* (2006.01)
(52) U.S. Cl. ..................... 320/109; 191/29 R
(58) Field of Classification Search .......... 320/109; 191/29 R
See application file for complete search history.

(56) References Cited

U.S. PATENT DOCUMENTS
5,272,431 A * 12/1993 Nee ............... 320/109
(Continued)

FOREIGN PATENT DOCUMENTS
EP 0 744 809 A2 11/1996
(Continued)

OTHER PUBLICATIONS
Machine Translation for JP 2006232102.*
(Continued)

*Primary Examiner* — Edward Tso
*Assistant Examiner* — Ramy Ramadan
(74) *Attorney, Agent, or Firm* — Manabu Kanesaka; Kenneth M. Berner; Benjamin J. Hauptman

(57) ABSTRACT

Provided is a railway type feeder-lineless traffic system in which the weight of a vehicle is reduced while the structure of the vehicle is simplified, and it is possible to carry out a quick charge during a brief stopping time at a station or the like. A charging method in a feeder-lineless traffic system in which a vehicle mounted thereon with an electric storage unit runs on a predetermined pathway with the use of a power, and the electric storage unit in the vehicle is charged from a charger set up on the pathway, wherein a contact charging way in which a power feeder 24 connected to the charger 21 set up on the ground is made into contact with a power receiver 6 mounted on a vehicle 1 is carried out when the vehicle 1 comes to a stop, and a commercial electric power is converted by the charger and a charge control unit of the charger into a DC power which is chargeable direct into the electric storage unit 1, and the DC power is quickly charged into the electric storage unit through the intermediary of the power feeder and the power receiver while a current value of the DC power is controlled.

13 Claims, 5 Drawing Sheets

U.S. PATENT DOCUMENTS

| | | | |
|---|---|---|---|
| 5,298,849 A * | 3/1994 | Drexel et al. | 320/109 |
| 5,631,533 A | 5/1997 | Imasaki | |
| 6,114,834 A * | 9/2000 | Parise | 320/109 |
| 6,294,886 B1 | 9/2001 | Gibard | |
| 6,525,510 B1 * | 2/2003 | Ayano et al. | 320/109 |
| 7,231,877 B2 * | 6/2007 | Kumar | 105/35 |
| 7,430,967 B2 * | 10/2008 | Kumar | 105/35 |
| 2002/0096412 A1 | 7/2002 | Batisse | |

FOREIGN PATENT DOCUMENTS

| | | |
|---|---|---|
| JP | H03-93403 | 4/1991 |
| JP | H05-15073 | 1/1993 |
| JP | H07-31009 | 1/1995 |
| JP | U H07-11805 | 2/1995 |
| JP | U H07-23904 | 5/1995 |
| JP | H11-242522 | 9/1999 |
| JP | H11-285109 | 10/1999 |
| JP | 2000-83302 | 3/2000 |
| JP | 2002-281610 | 9/2002 |
| JP | 2002-305808 | 10/2002 |
| JP | 2006-54958 | 2/2006 |
| JP | 2006-232102 | 9/2006 |

OTHER PUBLICATIONS

Machine Translation for JP 11285109.*

* cited by examiner

FEEDER-LINELESS TRAFFIC SYSTEM AND CHARGING METHOD THEREFOR

BACKGROUND OF THE INVENTION

1. Field of the Invention

The present invention relates to a feeder-lineless traffic system in which a vehicle mounted thereon with an electric storage unit runs on a predetermined pathway such as a railway while receives a power from a ground charging equipment, and to a charging method therefor, and in which a charge control unit is provided on the ground so as to reduce the weight of the vehicle and to simplify the structure of the vehicle.

2. Description of the Related Art

These years, as to a traffic system for running a vehicle on a predetermined railway, there has been proposed a feeder-lineless traffic system utilizing an electric car which can run with no supply of a power from an aerial line. The electric car in the feeder-lineless traffic system is installed therein with an electric storage unit.

For example, Patent Document 1 (Japanese Patent Laid-Open No. 2000-83302) discloses a feeder-lineless traffic system as stated above.

In the traffic system disclosed in the Patent Document 1, a vehicle has a movable power receiver which makes contact with a power feeder provided in a power supply on a station when the vehicle comes to a stop at the power supply, and charging to an onboard electric storage unit is started under instructions by a control unit mounted on the vehicle.

When the power accumulation of the electric storage unit becomes a predetermined value, the onboard control unit delivers a supply stop instruction signal to the power receiver in order to separate the power receiver from the power feeder and to isolate between the power receiver and the electric storage unit. Thus, the on-board control unit controls the power receiving value, a charge voltage, a charging time and the like.

Further, Patent Document 2 (Japanese Patent Laid-Open No. 2006-54958) discloses a feeder-lineless traffic system having such an arrangement that a charging equipment is installed on the ground. This charging equipment comprises a charger composed of a primary core, a primary coil wound on the primary core, a charging power source for feeding a high-frequency power to the primary coil, a communication unit for transmitting charging data (a charging condition of an electric storage unit or the like) transmitted from an onboard communication unit in a vehicle, and a control unit for controlling a charging power, a charging voltage, a charging time and the like in accordance with the thus received charge data.

During charging, a high frequency power is fed from the charging power source to the primary coil, and accordingly, the primary core generates a high frequency magnetic flux which produces an AC power (induced electromotive force) in a secondary coil provided on the vehicle side. The AC power induced in the secondary coil is converted into a DC power by a rectifier provided on the vehicle side, and is accumulated in the onboard electric storage unit.

In the feeder-lineless traffic system disclosed in Patent Document 1, the charge control unit for controlling the power accumulation value and the charging time of the electric storage unit is provided in the vehicle. Thus, the weight of the vehicle is increased, and the structure of the vehicle is complicated if the charge control unit is set up, underfloor of the vehicle. Further, every vehicle requires the charge control unit, and accordingly, the installation costs of the overall traffic system are increased. Further, an onboard charger having a limited size should be used if it is used, the charging time becomes longer, and further, the charging control should be carried out onboard, resulting in a problem of heavily burdening the driver.

Further, in the feeder-lineless traffic system disclosed in the Patent Document 2, since the charge control unit is installed on the ground, the weight of the vehicle can be decreased, and as well, the number of the charge control unit can be reduced so as to offer such an advantage that the installation costs can be reduced. However, this charging system utilizes a noncontact type charging system in which a high frequency power is supplied to a primary coil set up on the ground so as to induce an AC power in a secondary coil. Accordingly, communication units should be provided on both vehicle side and ground side, as stated above, in order to carry out information exchange so as to allow the charge control unit set up on the ground to obtain data as to the charging of the onboard electric storage unit. Accordingly, there would be possibly caused problems of complicating the configuration of components and increasing the costs on both ground side and vehicle side.

SUMMARY OF THE INVENTION

The present invention is devised in view of the above-mentioned problems inherent to the prior art, accordingly, an object of the present invention is to provide a feeder-lineless traffic system which can reduce the weight of a vehicle, and can simplify the configuration of the vehicle while reducing the installation costs of the traffic system. Further, another object of the present invention is to propose a charging method in which quick charge can be made during a brief stop period at a station or the like.

To the end, according to the present invention, there is provided a charging method in a feeder-lineless traffic system in which a vehicle mounted thereon with an electric storage unit runs on a predetermined pathway with the use of an electric power, and the electric storage unit mounted on the vehicle is charged by a charger set up on the pathway, carrying out a contact type charging way so that a power feeder connected to the charger set up on the ground and a power receiver provided on the vehicle are made into contact with each other, the charger and a charge control unit provided in the charger converting a commercial electric power into a DC power which can be directly charged into the electric storage unit, and the DC power being quickly charged in the electric storage unit through the power feeder and the power receiver while a current value of the DC current is controlled.

The method according to the present invention carries out such a contact charging way that the power feeder connected to the charger set up on the ground and the power receiver mounted on the vehicle are made into contact with each other during stopping of the vehicle. Since the contact charging way is used, a charging condition of the electric storage unit mounted on the vehicle can be detected by the charge control unit set up on the ground. Accordingly, it is possible to eliminate the necessity of a communication system for detecting date of a charging condition of the electric storage unit mounted on the vehicle and the like. Thereby it is possible to reduce the installation cost.

Further, since the charging of the electric storage unit mounted on the vehicle is controlled by the charger and the charge control unit of the charger which are set up on the ground, it is not necessary to mount the charger and the charge control unit on the vehicle, thereby the weight of the vehicle can be decreased, and the structure of the vehicle can be simplified. Since the power consumption of the vehicle can be reduced, and accordingly, it is economically advantageous. Further, it is not necessary to provide the charge control unit on every vehicle, and accordingly, a required number of them can be reduced, thereby it is possible to reduce the installation costs.

Further, since the charge control is carried out on the ground, the burden of the driver can be reduced. That is, when the vehicle comes to a stop at a charging position, the charging is automatically started, and accordingly, the driver can start the vehicle after recognizing the completion of charging. Thus, since the standing time of the vehicle can be shortened, a chart diagram of the traffic system can be conventionally prepared even though the vehicle is charged at a station. In comparison with a conventional charging system consisting of a trolley wire and a pantograph in combination, it is only necessary to cope with mechanical abrasion, and accordingly, abrasion of the power feeder can be reduced.

In order to reduce abrasion of sliding parts although it is by a small degree, so as to eliminate the necessity of the maintenance therefor, the power feeder and the power receiver are made into contact with each other after the vehicle is completely stopped, thereby it is possible to eliminate the mechanical abrasion.

Further, in the method according to the present invention, since the commercial electric power is converted by the charger and the charge control unit of the charge into a DC power which can be directly charged in the electric storage unit, it is not necessary to mount a converter for conversion into a power to be charged, on the vehicle. Thus, it is possible to simplify the configuration of components on the vehicle side. Further, since the electric storage unit can be charged under the control of the current value of the power while a chargeable voltage is maintained, the current value can be increased during charging, thereby it is possible to carry out a quick charge.

Further, since the charger is a ground equipment, no size limitation thereto is required, that is, the charger can have a larger structure, a quick charge can be made so as to shorten the charging time.

It is noted in the method according to the present invention that a voltage of the electric storage unit may be preferably compared with a set voltage in a complete charge condition in order to stop the charging when the charging condition of the electric storage unit reaches the set charge completion condition. Thus, the electric storage unit can be charged in a desired charging condition.

Further, in the method according to the present invention, since electric storage units mounted on a plurality of trained vehicles can be charged at the same time by only one charger, charging can be automatically made for a vehicle having a small residual power due to the provision of constant current charging, and accordingly, the traffic control can be prevented from being hindered while the vehicles can be efficiently charged. Further, a charging condition may be detected so as to pick up a vehicle having a less residual charge for charging, and further, the vehicles are preferentially charged in the order of earlier time schedules on the diagram.

Further, according to the present invention, there is provided a feeder-lineless traffic system in which a vehicle mounted thereon with an electric storage unit runs on a predetermined pathway with an electric power while the electric storage unit is charged from a charger set up on the pathway, wherein a power feeder connected to the charger and a power receiver mounted on the vehicle are made into contact with and separated from each other during stopping of the vehicle, and the charger and a charge control unit for converting a commercial electric power into a DC power which can be directly charged into the electric storage unit, and for stopping the charging when the electric storage unit is charged up to a preset charging condition are provided on the ground.

The charger, in the traffic system according to the present invention, is of a contact type capable of charging the vehicle when the vehicle comes to a stop in the vicinity of a charging equipment set up on the ground, in such a way that the power feeder connected to the charger is made into contact with the power receiver mounted on the vehicle. Due to the contact type, a charging condition of the electric storage unit mounted on the vehicle can be detected by the charge control unit set up on the ground. Accordingly, a communication equipment for detecting a charging condition of the electric storage unit is not required, thereby it is possible to reduce the installation costs. Further, since the charge control unit is set up on the ground, it is possible to eliminate the necessity of mounting the charge control unit on the vehicle, thereby it is possible to decrease the weight of the vehicle, and to simplify the configuration of the vehicle.

With the use of the traffic system according to the present invention, the method according to the present invention can be implemented, and accordingly, the above-mentioned technical effects and advantages can be obtained by the method according to the present invention.

The traffic system according to the present invention, may have such a configuration that the power receiver is a contactor secured on the roof of the vehicle, and the power feeder is composed of a feeding shoe provided above the contactor on a ground structure through the intermediary of a link mechanism so as to be vertically movable, and a means for lowering the feeding shoe by resiliently urging the feeding shoe, down to a position where it is made into contact with the contactor.

In the above-mentioned configuration, the feeding shoe is lowered by the lowering means down to a position where it is made into contact with the contactor, and accordingly, the feeding shoe is automatically made into contact with the contactor when the vehicle comes into a charging position, thereby it is possible to carry out charging through the feeding shoe and the contactor which are made into contact with each other. With this configuration, since the contactor is secured to the vehicle while a moving mechanism and an urging mechanism for the feeding shoe are set up on the ground, the configuration of the power receiver mounted on the vehicle side can be simplified. Further, in order to prevent the power receiver and the power feeder from being worn, as possible as it can, so as to eliminate the necessity of maintenance therefor, a means for moving the feeding shoe which has been resiliently moved to a position where it is made into contact with the contactor, in a direction in which the feeding shoe is separated from the contactor is provided. Thus, the feeding shoe may be lowered by the moving means after the vehicle comes to a stop, and is made into contact with the contactor.

Further, in the traffic system according to the present invention, the power receiver is a planar contact secured to the roof of the vehicle, arranged in an advancing direction of the vehicle and having a predetermined thickness, and the power feeder is composed of a pair of feeding shoes arranged on opposite sides of the contactor, and provided on ground structures through the intermediary of link mechanisms so as to be capable of moving to and away from the contactor, and means for resiliently urging the pair of feeding shoes in a direction in which the feeding shoes approach each other so as to press the pair of feeding shoes against the contactor inserted between the pair of feeding shoes.

In the above-mentioned configuration, the feeding shoes and the contact are arranged at a substantially at the same level, and accordingly, the contactor enters between the pair of feeding shoes as the vehicle runs. With this configuration in which the contactor is secured to the vehicle, and the pressing mechanism is set up on the ground, the configuration of the power receiver mounted on the vehicle can be simplified. Further, even the position of the contactor is shifted in a direction perpendicular to the advancing direction of the vehicle, the total of pressing forces with which the feeding shoes are pressed against the contactor on the opposite sides of the later, is always constant, thereby it is possible to satisfactorily maintain always the contact condition between the contactor and the power feeder.

Also in this case, in order to prevent the power receiver and the power feeder from being worn, as possible as it can, so as to aim at eliminating the necessity of maintenance therefor, there may be provided a means for moving the feeding shoes which have been resiliently moved to a position where they are made into contact with the contactor, in a direction in which they are separated from the contactor, so that the feeding shoes are moved by the moving means toward the contactor, and are made into contact with the contactor after the vehicle comes to a stop.

Further, in the traffic system according to the present invention, a plurality of power feeders may be provided so as to simultaneously charge electric storage units on a plurality of vehicles, and the power receiver on a vehicle in which the electric storage unit has been charged up to a set charge complete condition, may be individually separated from the associated power feeder. With this configuration, a plurality of vehicles having electric storage units with different charging conditions can be simultaneously charged up to a set voltages.

In the above-mentioned configuration, if a plurality of power feeders are arranged among a plurality of pathways, a plurality of vehicles running on different pathways can be simultaneously charged. Further, if a plurality of power feeders are arranged along one and the same pathway, a plurality of trained vehicles or a plurality of vehicles not trained with one another, can be simultaneously charged. Alternatively, the power feeder may be extended along a plurality of power receivers on a plurality of vehicles, so as to allow the extended power feeder to make contact with the plurality of power receivers. With this configuration, even though the position at which the vehicle comes to a stop is shifted more or less, the power receiver can be surely made into contact with the power feeder.

With the charging method according to the present invention utilizing a contact charging way in which the power feeder connected to the charger set on the ground and the power receiver mounted in the vehicle are made into contact with each other when the vehicle comes to a stop so that a commercial electric power is converted by the charger and the charge control unit of the charger into a DC power which can be directly charged into the electric storage unit, and which can be quickly charged into electric storage unit while the current value thereof is controlled through the intermediary of the power feeder and the power receiver, the necessity of a charge control unit and a power converting unit to be mounted on the vehicle, and a unit for detecting a charging condition of the electric storage unit from the ground can be eliminated, thereby it is possible to decrease the weight of the vehicle and to simplify the configuration of the vehicle.

Further, since the quick charge to the vehicle becomes possible, sufficient charging can be made at a brief stop of the vehicle at a station or the like.

Moreover, with the traffic system according to the present invention in which the power feeder connected to the charger and the power receiver mounted on the vehicle are mage into contact with and separated from each other, and a commercial electric power is converted into a DC power which can be charged into the electric storage unit while the charger and charge control unit of the charger for stopping the charging when the electric storage unit is charged up to a preset charged condition are set up on the ground, the necessity of a charge control unit and a power converting unit to be mounted on the vehicle, and a unit for detecting a charging condition of the electric storage unit from a ground equipment can be eliminated, thereby it is possible to decrease the weight of the vehicle and to simplify the configuration of the vehicle.

DETAILED DESCRIPTION OF THE PREFERRED EMBODIMENT

Detailed description will be made of the present invention in the form of specific embodiments which are shown in the accompanying drawings. It is not intended that the present invention should be limited only to the dimensions, materials, shapes and relative arrangements of components stated in these embodiments unless otherwise specified.

Embodiment 1

Figure 1:
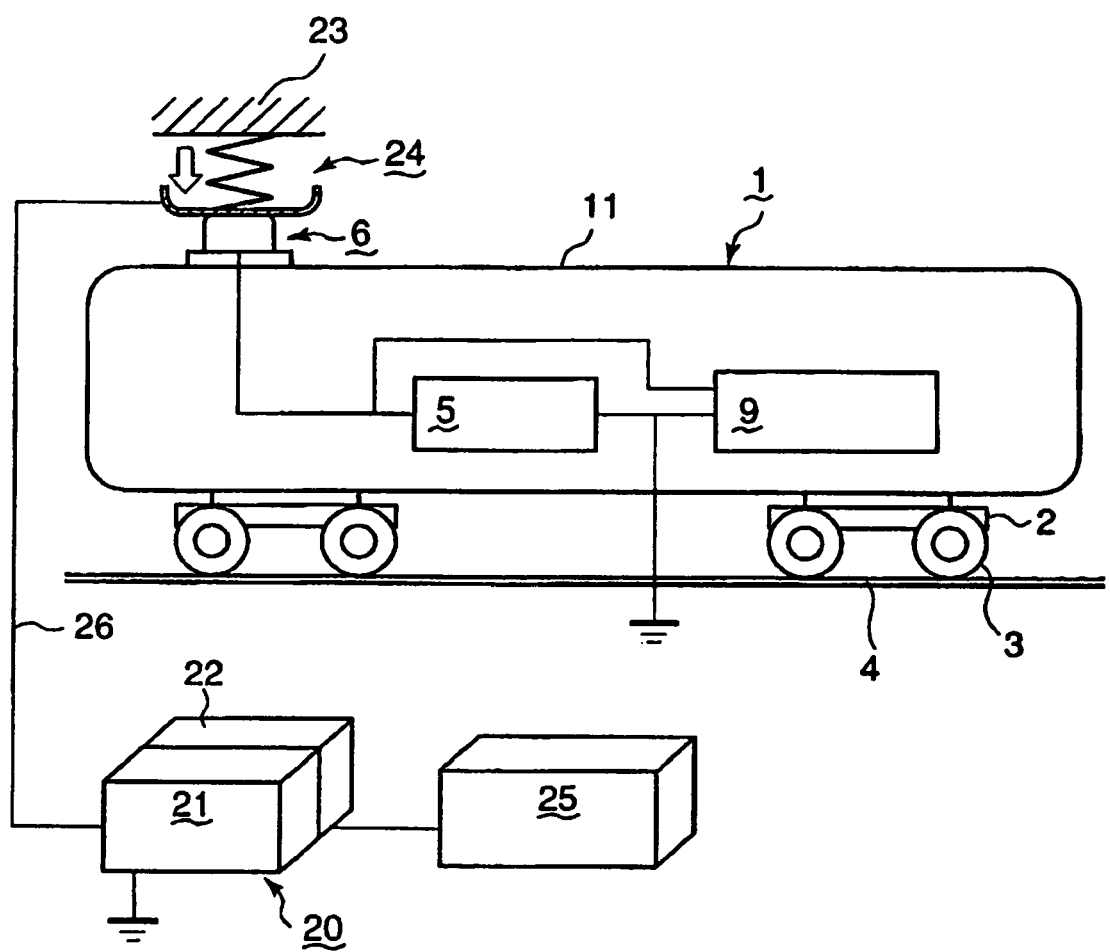
FIG. 1 is a schematic view illustrating a first embodiment of the present invention in its entirety.
Figure 2:
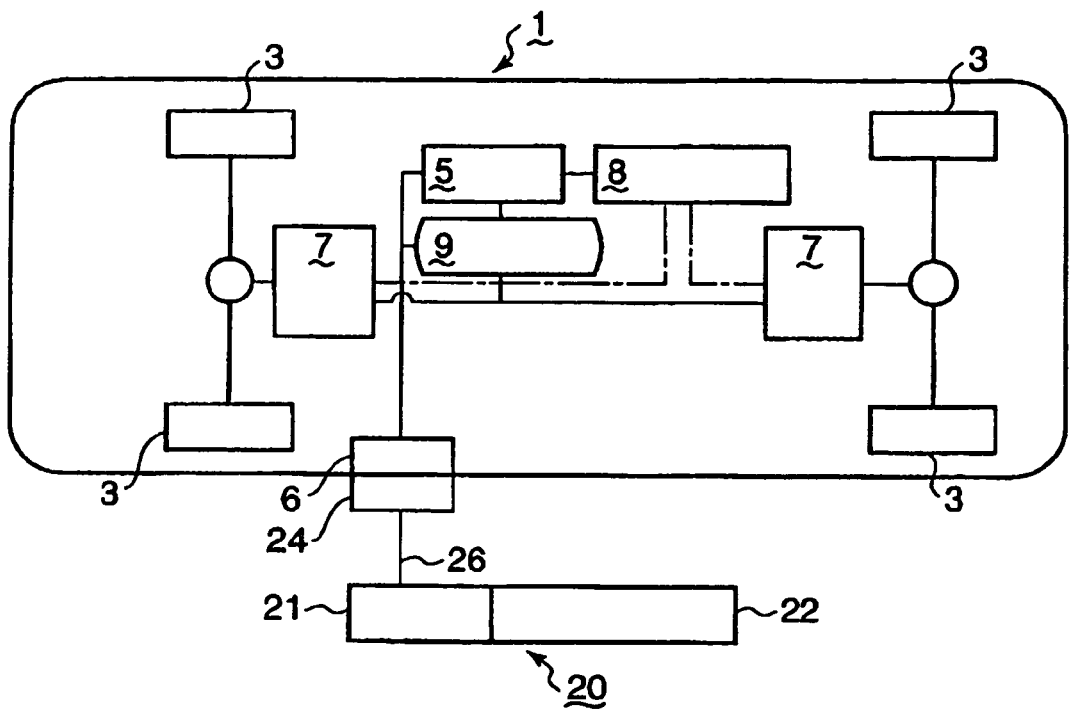
FIG. 2 is a block diagram illustrating a control system in the first embodiment.
Figure 3:
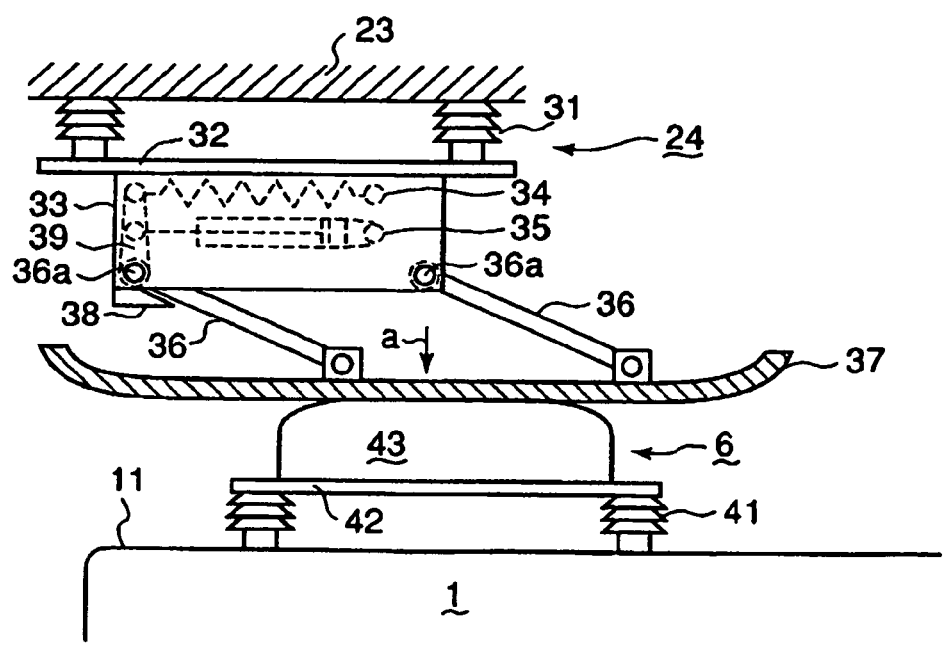
FIG. 3 is a partly enlarged elevation view illustrating a power feeder and a power receiver in the first embodiment.
Figure 4:
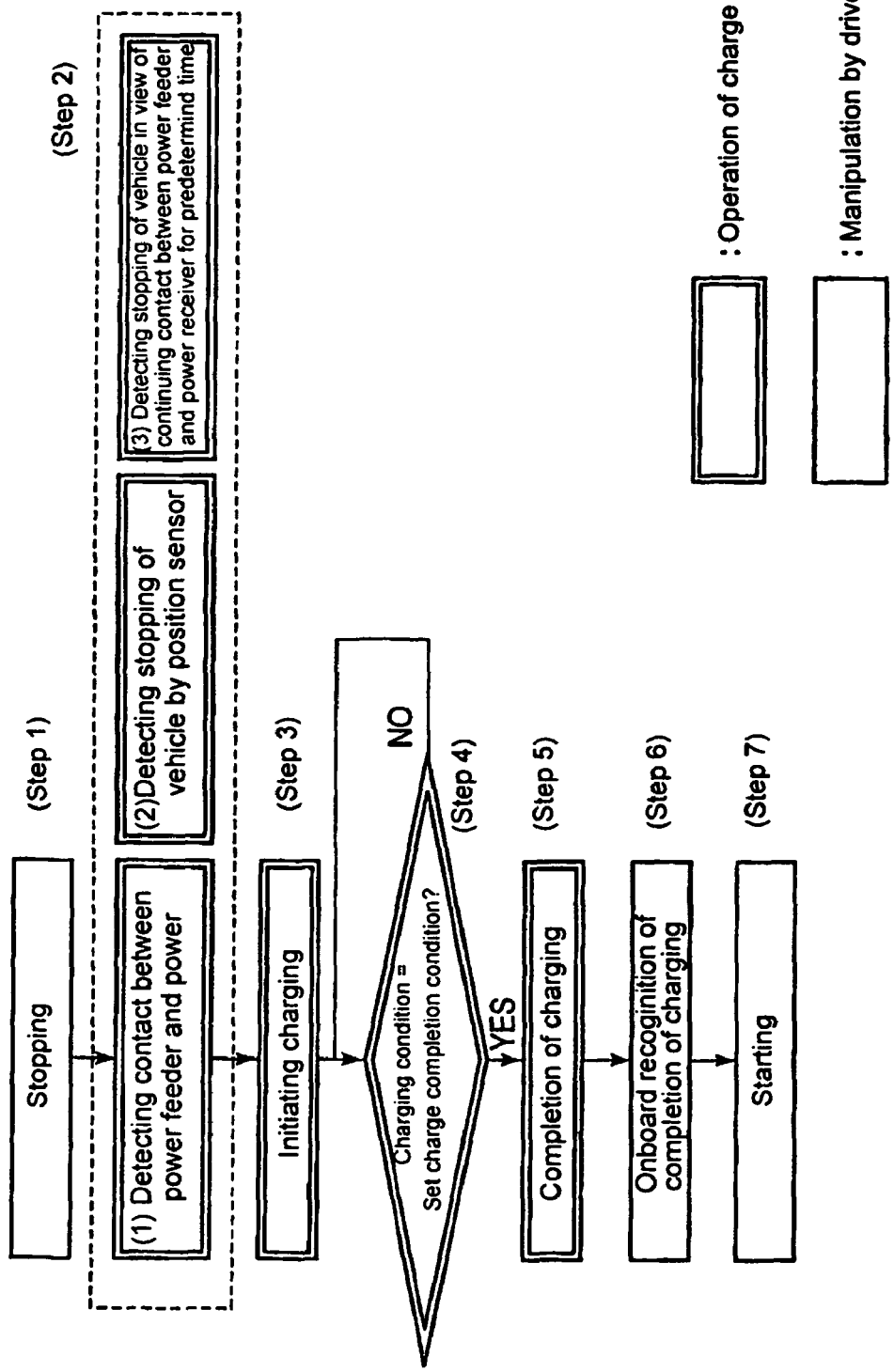
FIG. 4 is a flowchart which shows operation steps in the first embodiment.

A first embodiment of the present invention will be described with reference to FIGS. 1 to 4, in which FIG. 1 is a schematic view illustrating a feeder-lineless traffic system in this embodiment in its entirety, FIG. 2 is a block diagram illustrating a control system in this embodiment, FIG. 3 is a partly enlarged elevation view illustrating a power feeder and a power receiver in this embodiment, and FIG. 4 is a flowchart for describing operation steps in this embodiment.

Referring to FIG. 1, a vehicle 1 incorporates bogies 2 having wheels 3. Further, the vehicle 1 is mounted thereon with a storage cell 5, adapted to be fed with a power from a charger 20 set up on the ground when the vehicle 1 comes to a stop at a station or the like, in order to run on a railway 4. A charging equipment 20 provided at a station or the like, comprises a charger 21 for converting a commercial electric power fed from a transformer station 25, into a DC voltage which can be fed into the storage cell 5, such as 400 V, and feeding the voltage to a power feeder 24 through a power line 26, a charge control unit 22 for controlling a charging time, a charging volume and the like, and the power feeder 24 which is located above the roof 11 of the vehicle 1 having come to a stop and is attached to a ground structure 23.

Referring to FIG. 2, the vehicle 1 are provided at four corners with the wheels 3, and is provided with motors 7 for driving the wheels 3, and a controller 8 for controlling the drive motors 7. Further, a power receiver 6 is mounted on the roof 11 of the vehicle 1, and is adapted to be made into contact with the power feeder 24 so as to receive a DC power from the power feeder 24. The DC power received by the power receiver 6 is fed to and accumulated in the electric storage cell 5 from which a part of the DC power is fed to an inverter 9. The DC power fed from the electric storage cell 5 to the inverter 9 is converted into a three-phase AC power which drives the drive motor 7.

Next, description will be made of the configurations of the power feeder 24 and the power receiver 6. Referring to FIG. 3, the power feeder 24 will be at first described. A support frame 32 is attached to the ground structure 23 through the intermediary of insulators 31 in a horizontal direction, above a contactor 43 secured to the roof 11 of the vehicle 1. A support plate 33 is attached to the lower part of the support frame 32, and is attached thereto with an urging spring 34 and a return electric cylinder 35. The urging spring 34 is connected at one end to one end of an arm 39 whose the other end is connected to a pivot 36a.

The return electric cylinder 35 is connected at one end to the support plate 33 and at the other to the intermediate part of an arm 39. The support plate 33 is connected at its lower opposite ends with two link bars 36 through the intermediary of pivots 36a. The two link bars 36 are attached at their distal ends with a high conductive feeding shoe 37 in a horizontal direction.

Meanwhile, in the power receiver 6, a support frame 42 is attached to the roof 11 of the vehicle 1 through the intermediary of the insulators 41, and a high conductive contactor 43 is secured to the upper part of the support frame 42. With this configuration, the resilient force of the urging spring 34 in the contracting direction is exerted to the feeding shoe 37 through the intermediary of the link bars 36. As a result, a downward pressing force is applied to the feeding shoe 37, and accordingly, the feeding shoe 37 is pressed against the upper surface of the contactor 43.

It is noted that the opposite end parts of the feeding shoe 37 are curved upward so as to prevent the contactor 43 from impinging upon one end part of the feeding shoe 37 when the contactor 43 approaches thereto. Further, a stopper 38 is attached to the lower end part of the support plate 33 so as to delimit the downward limit of the feeding shoe 37.

Next, description will be made of the operation steps of this embodiment with reference to FIG. 4. The vehicle 1 comes to a stop in a charging place such as a station in which the ground charging equipment 20 is set up (step 1), by manipulating the driver. At this time, since the feeding shoe 37 has been lowered at the height of the contactor 34 by the resilient force of the urging spring 34, when the vehicle 1 comes to a stop in the charging place, the feeding shoe 34 and the contactor 34 are made into contact with each other, (1) resulting in a variation in load impedance which is detected by the charge control unit 22, and accordingly, the contact between the feeding shoe 37 and the contactor 43 can be detected. Thus, upon this detection, the charging can be started.

However, stopping of the vehicle 1 may be detected as a charge starting term in order to enhance the safety. For example, (2) a position sensor is set up on the ground in order to detect stopping of the vehicle 1. Alternatively, (3) the stopping may be detected if the contact between the feeding shoe 37 and the contactor 43 continues for a predetermined time such as 5 sec (step 2). If a longer charging time is desirable, (1) is selected while if enhanced safety is desirable, (1) and (2) or (1) and (3) are selected.

The charge control unit 22 starts the supply of a power (step 3) when the contact between the feeding shoe 37 and the contactor 43 is detected. During the charging, the storage cell 5 is charged under control of a current value. That is, the charging is carried out by a large current value, and quick charge can be made.

Thus, sufficient charging can be made in a brief stopping time at a station or the like.

In the progress of the charging, when the residual power value is increased, the charge control unit 22 detects a charging condition of the storage cell 5, and is compared with a set complete charge condition (step 4). If the charging condition of the storage cell 5 comes up to the set charge complete condition, the supply of a power is stopped (step 5). In this case, the charging condition may be monitored in the vehicle in order to recognize a completion of charging (step 6). When start preparation is thereafter completed, the driver starts the vehicle 1 (step 7).

Thus, in this embodiment, the charger 21 and the charge control unit 22 are set up on the ground, and a chargeable DC current is fed, as it is, to the onboard storage cell 5 from the charger 21 set up on the ground. Thus, it is not necessary to mount the charge control unit 22 on the vehicle 1, and accordingly, the weight of the vehicle 1 can be reduced. Further no converter is required on a path for feeding a power from the power receiver 6 to the storage cell 5. Thus, according to the present invention, the weight of the vehicle 1 can be decreased, and as well, the number of components to be mounded in the vehicle 1 can be reduced, thereby it is possible to simplify the structure of the vehicle.

Further, in this embodiment in which there is utilized such a contact charging way that the power feeder 24 and the power receiver 26 are made into contact with each other during charging, a charging condition of the storage cell 5 can be detected by the charge control unit 22. Thus, no communication equipment for detecting a charging condition of the storage cell 5 from the ground is not required, thereby it is also possible to reduce the installation costs also in view of this point.

Further, since the charger 21 and the charge control unit 22 are set up on the ground, the numbers of chargers and charge control units which have been conventionally required by a number corresponding a number of vehicles can be remarkably decreased. Thus, the installation costs for the overall traffic system can be reduced. Further, since the charger 21 can be set up on the ground, it is not necessary to limit the size thereof. Accordingly, a large size charger can be used so that quick charge can be made, thereby it is possible to shorten the charging time.

Further, charge control is carried on the ground side, the burden to the drive can be reduced. That is, the driver has to carry out only such a procedure that the vehicle is stopped and, then, is stared after completion of charging. Accordingly, the stopping time can be shortened. A chart diagram can be conventionally prepared in the case of stopping at a station or the like. If no maintenance is desired, since the energization is made after the vehicle is completed stopped, no risk of occurrence of electric abrasion due to contact between the power receiver and the power feeder, that is, it is only required to cope with mechanical abrasion, thereby it is possible to reduce abrasion of the power feeder.

Further, in this embodiment in which the feeding shoe 37 is beforehand lowered to a position where it makes contact with the feeder 43, it is possible to omit the time required for moving the feeding shoe 37 up and down. Thus, a sufficient charging time can be taken. Meanwhile in such a case that it is important to reduce mechanical abrasion of the feeding shoe 37 or the contactor 43 so as to eliminate the necessity of maintenance, the return electric cylinder 35 may be operated to move the feeding shoe 37 up and down so as to retract the feeding shoe 37 upward when the vehicle 1 comes in or starts.

Embodiment 2

Figure 5:
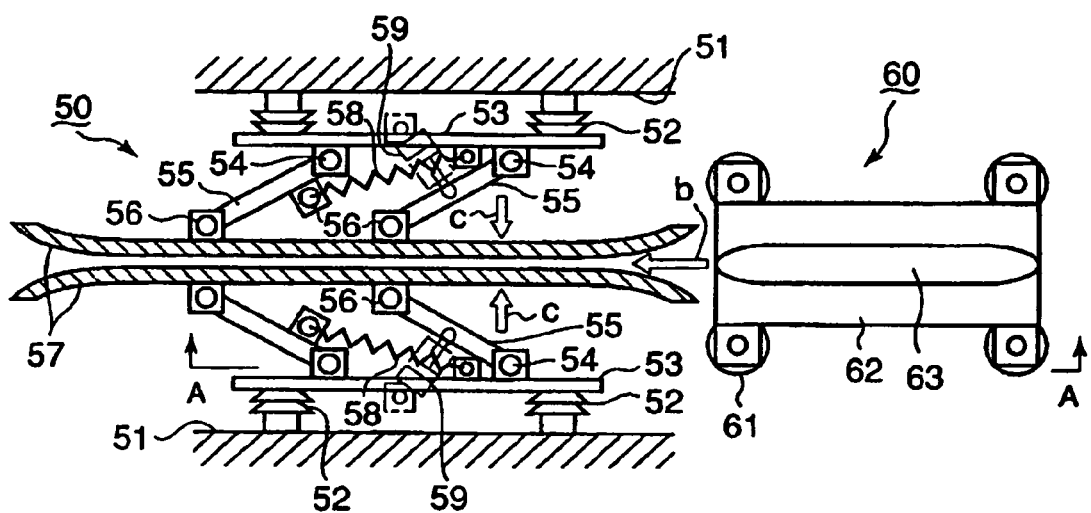
FIG. 5 is a plan view illustrating a power feeder and a power receiver in a second embodiment of the present invention.
Figure 6:
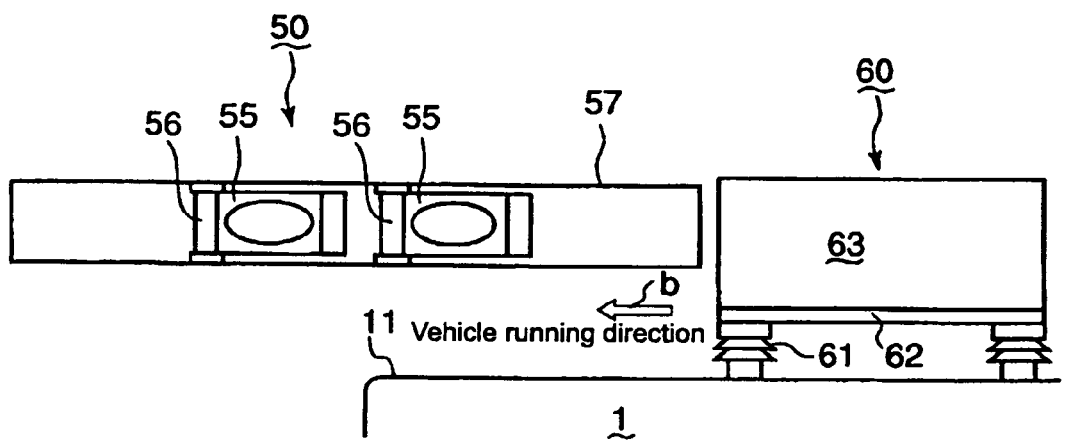
FIG. 6 is a vertical sectional view along line A-A in FIG. 5 as viewed vertically.

Next, second embodiment of the present invention will be described with reference to FIGS. 5 and 6, in which FIG. 5 is a plan view which shows a power feeder and a power receiver in this embodiment, and FIG. 6 is an explanatory view along line A-A, as viewed in a vertical direction. Referring to FIGS. 5 and 6, in a power receiver 60 fixed to the roof 11 of the vehicle 1, a support frame 62 is supported in a horizontal direction to the roof 11 of the vehicle 1 through the intermediary of insulators 61, and is mounted thereon with a planar contactor 63, upright thereto, being extended in a vehicle advancing direction b.

Meanwhile, in the power feeder 50, a support frame 53 is laid in a vehicle running direction b along each of ground structures 51 arranged on opposite sides of the contactor 63, through the intermediary of insulators 52. Two link bars 55 are rotatably attached to the outer surface of the support frame 53 through the intermediary of pivots 54. Further, the link bars 55 are attached at the other end thereof with a long planar feeding shoe 57 through the intermediary of pivots 56 so as to be rotatable, relative to the link bars 36. Further, there is provided an urging spring 58 having one end connected to the link bar 55 and the other connected to the support frame 53. The feeding shoe 57 is urged by the resilient force of the urging spring 58 in a direction in which the opposite feeding shoes 36 approach together (as indicated by an arrow a). Further, the feeding shoes 57 are curved at opposite ends in directions in which the feeding shoes 57 go away from each other so as to facilitate the insertion of the contactor 63 between the feeding shoes 57.

With this configuration of the second embodiment, when the vehicle 1 runs in the running direction (indicated by an arrow b), the contact 63 is inserted between the pair of the feeding shoes 57. When the contactor 63 is inserted between the feeding shoes 57, the vehicle 1 comes to a stop. It is noted that the space between the feeding shoes in the energized condition is normally set to be not greater than the thickness of the contactor 63. Accordingly, the feeding shoes 57 and the contactor 63 are pressed against one another by the resilient force of the urging spring 53. In this condition, the charging to the vehicle 1 is started.

In this embodiment, similar to the embodiment 1, the power receiver 60 composed of the contactor 63 is secured to a vehicle control unit 10 while the power feeder 50 incorporates the moving mechanism and the pressing mechanism with respect to the contactor 63', and accordingly, the configuration of the power receiver 60 mounted on the vehicle can be simplified. Further, even though the position of the contactor 63 is shifted in a direction perpendicular to the vehicle running direction, the total pressing force against the contactor 63 by the left and right feeding shoes 57 is always maintained to be constant. Thus, even though the contactor 63 is shifted in a direction perpendicular to the vehicle running direction, the contact condition between the feeding shoes 57 and the contactor 63 is always maintained to be satisfactory, and the charging can be easily carried out without hindrance to the charging operation and without deteriorating the charging efficiency.

It is noted that a return electric cylinder 69 for retracting each feeding shoe 57 toward the ground structure 51 may be provided, as shown in FIG. 5, so as to separate the feeding shoe 57 from the contactor 63 when no charging is made. Alternatively, the return electric cylinder 69 may operated during coming-in of the vehicle 1, so that the feeding shoe 57 is set at a position separated from the contactor 63, and when the contactor 63 is inserted between the feeding shoes 57, the feeding shoes 57 may be made into contact with the contactor 63. After the completion of the charging, the return electric cylinder 59 is again operated so as to separate the feeding shoes from the contactor 63 before the vehicle 1 is started. In this case, in comparison with the second embodiment, an extra time is required for operating the feeding shoe 57, but the mechanical abrasion of the feeding shoes and the contactor 63 can be reduced, thereby it is possible to reduce the maintenance thereof.

Embodiment 3

Figure 7:
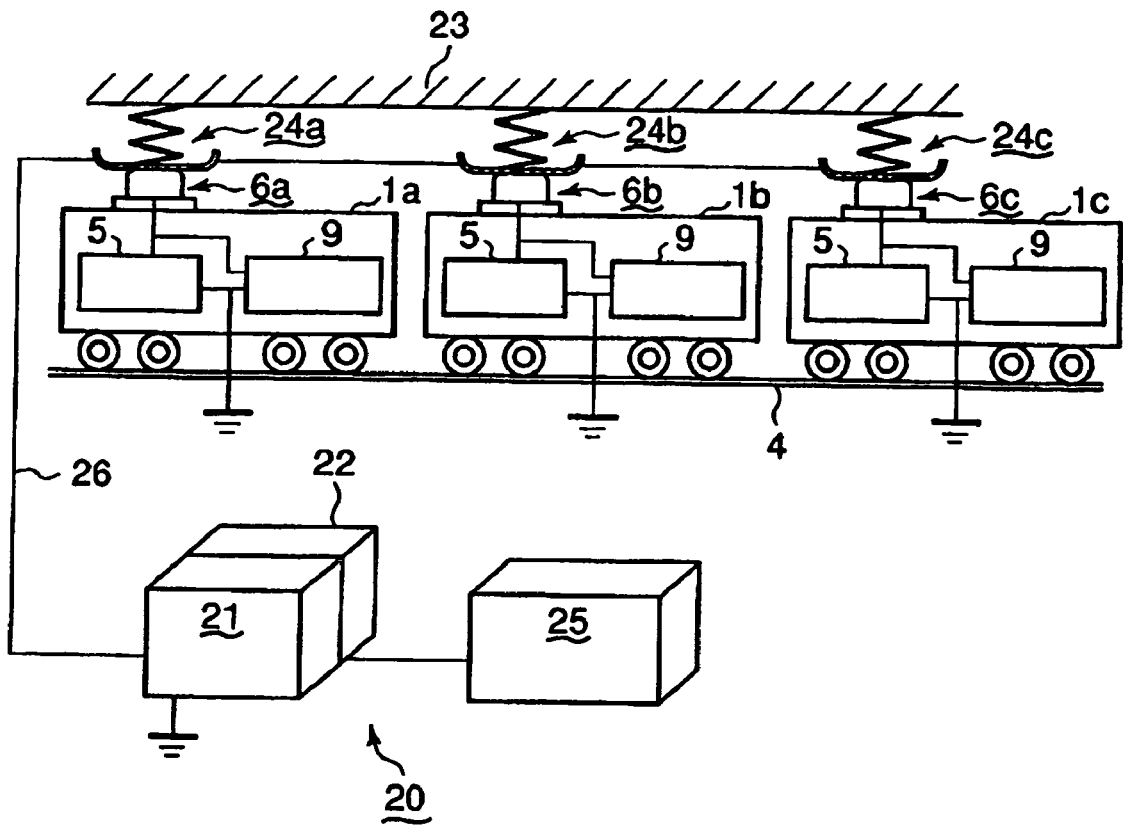
FIG. 7 is a schematic view illustrating a third embodiment of the present invention in its entirety.

Next, description will be made of a third embodiment of the present invention with reference to FIG. 7 which is a schematic view illustrating an overall feeder-lineless traffic system in this embodiment. Referring to FIG. 7, three power feeders 24a to 24c are provided on the ground structure 23, along the railway 4. With this embodiment, a plurality of vehicles 1a to 1c can be simultaneously charged through a group of charging equipments 20 set up on the ground.

It is noted in this embodiment, electric storage units in a plurality of trained vehicles can be charged from one power source, and a vehicle having a less residual power can be automatically charged preferentially through fixed current charging. Further, a charging condition may be detected so as to select and charge a vehicle having a less residual power.

Further, the power receiver of a vehicle in which the electric storage unit has been charged up to a set charge completion voltage may be separated individually. With this configuration, the individual electric storage units can be charged up to the charge completion condition, even for the vehicles having electric storage units with different charging conditions.

Further, if a plurality of power feeders are arranged among a plurality of pathways, a plurality of vehicles running on the different pathways can be simultaneously charged. Alternatively, the power feeder may be arranged along a plurality of power receivers provided in a plurality of vehicles, and accordingly, only one power feeder can be made into contact with the plurality of power receivers at the same time. With this embodiment, even thought the position where the vehicle comes to a stop, is shifted more or less, the power receiver in the vehicle can be surely made into contact with the power feeder.

Embodiment 4

Figure 8:
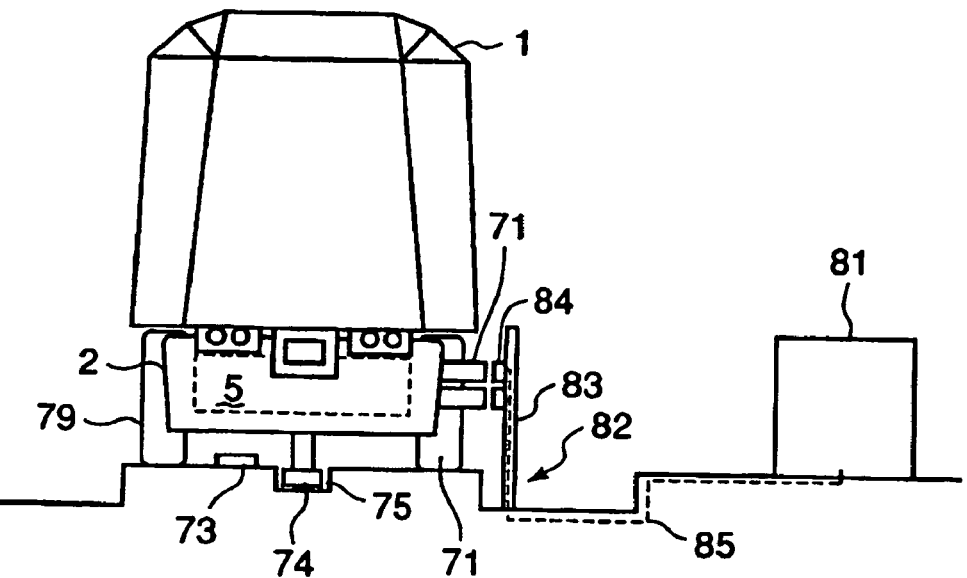
FIG. 8 is a side view illustrating a fourth embodiment of the present invention, as viewed in a vehicle running direction.

A fourth embodiment of the present invention will be described with reference to FIG. 8. In this embodiment, the present invention is applied in a new traffic system in which a vehicle incorporates rubber tires so as to run on a relatively short railway with the rubber tires. FIG. 8 is a side view which shows this embodiment as viewed in the vehicle running direction. Referring to FIG. 8, the vehicle 1 incorporates rubber tires 79 as running wheels, and runs on a predetermined railway 72. A bogie 2 incorporates an equipment such as an electric storage unit 5, which can run the vehicle 1 with an electric power. Further, a pantograph 71 constituting the power receiver is provided at a side surface of the bogie 2.

Meanwhile, in a ground charging equipment 80 set up on the ground, a charger 81 incorporated with a control function is provided. The charger 81 with the control function has a function in combination of the charger 21 and the charge control unit 22 shown in FIG. 1. A power feeder 82 which is provided adjacent the railway 72, is composed of a support frame 82 arranged upright adjacent to the railway 72, and feeding shoes 84 secured to the support frame 83 at a position where the shoes 83 face the pantograph 71 when the vehicle 1 comes to a stop. The charger 81 and the feeding shoes 84 are connected by a power line laid underground.

A signal line 73 is laid along the railway 72 so that data is exchanged between the vehicle 1 and a ground control station by way of the signal line 73. Further, the vehicle 1 runs in such a condition that a guide wheel 74 projected downward from the bogie 2 is inserted in a recess groove 75 which is formed in the center part of the railway 72, being extended along the railway 72. The vehicle 1 which runs by an automatic control mechanism has such a fail-safe mechanism that the guide wheel 74 travels within the recess groove 75 so as to control the running of the vehicle 1 even if the automatic control mechanism malfunctions.

Alternatively, instead of the above-mentioned fail-safe mechanism, there may be provided a mechanical guide mechanism composed of a guide rail laid on the railway side, and a guide wheel provided on the vehicle side and inserted in the rail guide. In the mechanical guide mechanism, the guide rail may be provided at the center of the railway but also at a position adjacent to the railway and along the railway.

With this configuration, after the vehicle comes to a stop for charging, when the pantograph 71 is positioned facing the feeding shoes 84, the pantograph 71 which is extendable is extended toward the feeding shoes 84 and is then pressed against the feeding shoes 84. In this condition, a power is fed from the charger 81 to the feeding shoes 84 by way of the power line 85, and accordingly, the storage cell 5 mounted on the vehicle 1 is charged.

Thus, in this embodiment, the charging can be made through the pantograph 71 provided at one side surface of the bogie 2 of the vehicle 1, thereby it is possible to simplify the structure of the pantograph 71.

INDUSTRIAL APPLICABILITY

According to the present invention, in a feeder-line less traffic system in which a vehicle runs on a predetermined pathway, the weight of the vehicle can be reduced, and the structure of the vehicle can be simplified.

The invention claimed is:

1. A charging method in a feeder-lineless traffic system in which an electrically powered vehicle with an electric storage unit, runs on a predetermined pathway and wherein the electric storage unit in the vehicle is charged from an external power source by way of a charger set on a predetermined location on a ground, the method comprising:

contacting a planar contactor which is secured to a roof of the vehicle, which extends upright in a vehicle advancing direction, and which has a predetermined thickness, with a power feeder connected to a ground charging equipment, the power feeder comprising a pair of feeding shoes which is supported through a link mechanism so as to be movable into and out of contact with the contactor in a horizontal direction perpendicular to the vehicle advancing direction, converting an electric power from the power source using the charger and a charge control unit of the charger, into DC power, the charge control unit controlling a current value of the DC power to be supplied to the electric storage unit, and starting charging of the electric storage unit when the charge control unit detects contact between the power feeder and the power receiver in view of a variation in load impedance and a ground supported position sensor detects a stopping of the vehicle or when the charge control unit detects the contact between the power feeder and the power receiver in view of the variation in the load impedance and the contact continuing for a predetermined time is detected.

2. A charging method in a feeder-lineless traffic system, as set forth in claim 1, wherein a charging condition of the electric storage unit is compared with a set charge completion condition, and when the charging condition of the electric storage unit reaches a set charge completion condition, the charging is stopped.

3. A charging method in a feeder-lineless traffic system, as set forth in claim 1, wherein the power source enables electric storage units in a plurality of vehicles to be charged at the same time, and a vehicle having less residual power is preferentially charged through constant current charging.

4. A charging method in a feeder-lineless traffic system, as set forth in claim 1, further comprising detecting charging conditions of electric storage units in a plurality of vehicles using the charge control unit so as to select a vehicle having less residual power in order to charge the thus selected vehicle.

5. A feeder-lineless traffic system in which an electrically powered vehicle with an electric storage unit runs on a predetermined pathway, and wherein the electric storage unit in the vehicle is charged from an external power source, comprising:

a charger set on the pathway and connected with the power source, a power feeder connected with the charger, a power receiver mounted on the vehicle and adapted to contact the power feeder when the vehicle is at standstill, wherein the power receiver is a planar contactor which is secured to a roof of the vehicle, which extends upright in a vehicle advancing direction, and which has a predetermined thickness, the power feeder comprises a pair of feeding shoes which is supported by a ground structure and which is disposed on opposite sides of the contactor, through a link mechanism so as to be movable into and out of contact with the contactor in a horizontal direction perpendicular to the vehicle advancing direction, and means for urging the pair of feeding shoes with a resilient force in a direction in which the pair of feeding shoes approaches each other so as to press the pair of feeding shoes against the contactor disposed therebetween, a charge control unit, the charge control unit and the charger being ground supported and adapted to covert electric power from the power source into a DC power and charge the electric storage unit until the electric storage unit is charged up to a previously set charging condition, and a ground supported position sensor, wherein the charge control unit starts charging of the electric storage unit when contact between the power feeder and the power receiver is detected in view of a variation in load impedance and the ground supported position sensor detects a stopping of the vehicle, or when the contact between the power feeder and the power receiver is detected in view of the variation in load impedance and the contact continuing for a predetermined time is detected.

6. A feeder-lineless traffic system in which an electrically powered vehicle with an electric storage unit runs on a predetermined pathway, and wherein the electric storage unit in the vehicle is charged from an external power source, comprising:
- a charger set on the pathway and connected with the power source,
- a power feeder connected with the charger, and
- a power receiver mounted on the vehicle and adapted to contact the power feeder when the vehicle is at standstill,
- wherein the power receiver is a planar contactor which is secured to a roof of the vehicle, which extends upright in a vehicle advancing direction, and which has a predetermined thickness,
- the power feeder comprises a pair of feeding shoes which is supported by a ground supported structure and which is disposed on opposite sides of the contactor, through a link mechanism so as to be movable into and out of contact with the contactor in a horizontal direction perpendicular to the vehicle advancing direction, and means for urging the pair of feeding shoes with a resilient force in a direction in which the pair of feeding shoes approaches each other so as to press the pair of feeding shoes against the contactor disposed therebetween.

7. A feeder-lineless traffic system as set forth in claim 6, further comprising means for moving the feeding shoe which has been moved to the position where the feeding shoe is in contact with the contactor with the resilient force, in a direction in which the feeding shoe moves away from the contactor.

8. A feeder-lineless traffic system as set forth in claim 5, wherein a plurality of power feeders are provided so as to allow electric storage units in a plurality of vehicles to be simultaneously charged, the power receiver in one vehicle in which a charging condition of the electric storage unit reaches a set charge completion condition is individually separated from the associated power feeder.

9. A feeder-lineless traffic system as set forth in claim 8, wherein the plurality of power feeders are associated with a plurality of pathways so as to enable a plurality of vehicles respectively running on the plurality of pathways to be simultaneously charged.

10. A feeder-lineless traffic system as set forth in claim 8, wherein the plurality of power feeders are arranged along a single pathway so as to allow a plurality of trained vehicles to be simultaneously charged.

11. A feeder-lineless traffic system as set forth in claim 5, wherein the power feeder is extended with respect to a plurality of power receivers provided on the vehicle so as to allow the plurality of power receivers to be simultaneously brought into contact with the power feeder.

12. A feeder-lineless traffic system as set forth in claim 5, wherein the power receiver comprises a pantograph and the power feeder comprises a support frame arranged upright adjacent to the pathway.

13. A feeder-lineless traffic system as set forth in claim 12, wherein the pantograph extends laterally outward from the vehicle toward the support frame.

* * * * *